(12) United States Patent
Krichtafovitch et al.

(10) Patent No.: US 10,161,625 B2
(45) Date of Patent: Dec. 25, 2018

(54) COMBUSTOR HAVING A NONMETALLIC BODY WITH EXTERNAL ELECTRODES

(71) Applicant: ClearSign Combustion Corporation, Seattle, WA (US)

(72) Inventors: Igor A. Krichtafovitch, Kirkland, WA (US); Joseph Colannino, Bellevue, WA (US); Robert E. Breidenthal, Seattle, WA (US); David B. Goodson, Bellevue, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 403 days.

(21) Appl. No.: 15/012,842

(22) Filed: Feb. 1, 2016

(65) Prior Publication Data

US 2016/0161110 A1    Jun. 9, 2016

Related U.S. Application Data

(63) Continuation-in-part of application No. PCT/US2014/045707, filed on Jul. 8, 2014.
(Continued)

(51) Int. Cl.
*F23L 7/00* (2006.01)
*F23C 99/00* (2006.01)
(Continued)

(52) U.S. Cl.
CPC ........... *F23C 99/001* (2013.01); *F23M 20/00* (2015.01); *F23R 3/002* (2013.01); *F23R 3/007* (2013.01);
(Continued)

(58) Field of Classification Search
CPC .......... F23C 99/001; F23B 2900/00006; F23R 3/007
See application file for complete search history.

(56) References Cited

U.S. PATENT DOCUMENTS 2,374,610 A    4/1945    MacLaren, Jr.
2,604,936 A    7/1952    Kaehni et al.
(Continued)

FOREIGN PATENT DOCUMENTS

EP    0844434    5/1998
EP    1139020    8/2006
(Continued)

OTHER PUBLICATIONS

M. Zake et al., "Electric Field Control of NOx Formation in the Flame Channel Flows." Global Nest: the Int. J. May 2000, vol. 2, No. 1, pp. 99-108.
(Continued)

*Primary Examiner* — Jason Lau
(74) *Attorney, Agent, or Firm* — Christopher A. Wiklof; Nicholas S. Bromer; Launchpad IP, Inc.

(57) ABSTRACT

A combustor may include a nonmetallic combustor body configured to hold a combustion reaction. The combustor may include and one or more electrodes disposed outside the nonmetallic combustor body and configured to apply electrical energy to the combustion reaction. The combustor may include a power supply operatively coupled to the one or more electrodes.

43 Claims, 6 Drawing Sheets

Related U.S. Application Data

(60) Provisional application No. 61/860,202, filed on Jul. 30, 2013.

(51) Int. Cl.
  *F23R 3/16* (2006.01)
  *F23R 3/00* (2006.01)
  *F23M 20/00* (2014.01)

(52) U.S. Cl.
  CPC ..... *F23R 3/16* (2013.01); *F23M 2900/05004* (2013.01)

(56) References Cited

U.S. PATENT DOCUMENTS

| | | | |
|---|---|---|---|
| 3,004,137 A * | 10/1961 | Karlovitz | E21B 7/14 |
| | | | 148/194 |
| 3,087,472 A | 4/1963 | Yukichi | |
| 3,167,109 A | 1/1965 | Wobig | |
| 3,224,485 A | 12/1965 | Blomgren, Sr. et al. | |
| 3,301,307 A | 1/1967 | Nishigaki et al. | |
| 3,306,338 A | 2/1967 | Wright et al. | |
| 3,416,870 A | 12/1968 | Wright | |
| 3,749,545 A | 7/1973 | Velkoff | |
| 3,841,824 A | 10/1974 | Bethel | |
| 4,020,388 A | 4/1977 | Pratt, Jr. | |
| 4,111,636 A | 9/1978 | Goldberg | |
| 4,439,980 A | 4/1984 | Biblarz et al. | |
| 5,370,525 A * | 12/1994 | Gordon | F23C 7/004 |
| | | | 431/11 |
| 5,515,681 A | 5/1996 | DeFreitas | |
| 5,702,244 A | 12/1997 | Goodson et al. | |
| 5,784,889 A | 7/1998 | Joos et al. | |
| 6,374,909 B1 | 4/2002 | Jeter et al. | |
| 7,137,808 B2 | 11/2006 | Branston et al. | |
| 7,159,646 B2 | 1/2007 | Dessiatoun et al. | |
| 7,243,496 B2 | 7/2007 | Pavlik et al. | |
| 7,845,937 B2 | 12/2010 | Hammer et al. | |
| 8,082,725 B2 | 12/2011 | Younsi et al. | |
| 8,141,371 B1 * | 3/2012 | Habarou | F23R 3/002 |
| | | | 60/753 |
| 9,151,549 B2 | 10/2015 | Goodson et al. | |
| 9,209,654 B2 | 12/2015 | Colannino et al. | |
| 9,243,800 B2 | 1/2016 | Goodson et al. | |
| 9,267,680 B2 | 2/2016 | Goodson et al. | |
| 9,284,886 B2 | 3/2016 | Breidenthal et al. | |
| 9,366,427 B2 | 6/2016 | Sonnichsen et al. | |
| 9,371,994 B2 | 6/2016 | Goodson et al. | |
| 9,377,190 B2 | 6/2016 | Karkow et al. | |
| 9,377,195 B2 | 6/2016 | Goodson et al. | |
| 9,383,100 B1 * | 7/2016 | Russell | F23J 7/00 |
| 9,388,981 B2 | 7/2016 | Karkow et al. | |
| 9,427,702 B2 | 8/2016 | Colannino et al. | |
| 9,441,834 B2 | 9/2016 | Colannino et al. | |
| 9,453,640 B2 | 9/2016 | Krichtafovitch et al. | |
| 9,469,819 B2 | 10/2016 | Wiklof | |
| 9,494,317 B2 | 11/2016 | Krichtafovitch et al. | |
| 9,496,688 B2 | 11/2016 | Krichtafovitch et al. | |
| 9,513,006 B2 | 12/2016 | Krichtafovitch et al. | |
| 9,562,681 B2 | 2/2017 | Colannino et al. | |
| 9,574,767 B2 | 2/2017 | Anderson et al. | |
| 9,696,034 B2 | 7/2017 | Krichtafovitch et al. | |
| 9,702,550 B2 | 7/2017 | Colannino et al. | |
| 9,732,958 B2 | 8/2017 | Wiklof | |
| 9,739,479 B2 | 8/2017 | Krichtafovitch et al. | |
| 9,797,595 B2 | 10/2017 | Karkow et al. | |
| 9,803,855 B2 | 10/2017 | Karkow et al. | |
| 2002/0088442 A1 | 7/2002 | Hansen et al. | |
| 2005/0170301 A1 * | 8/2005 | Pavlik | F23C 99/001 |
| | | | 431/2 |
| 2005/0208442 A1 | 9/2005 | Heiligers et al. | |
| 2006/0040127 A1 * | 2/2006 | Spitsberg | C04B 35/486 |
| | | | 428/632 |
| 2007/0020567 A1 * | 1/2007 | Branston | F02M 27/04 |
| | | | 431/8 |
| 2007/0261383 A1 * | 11/2007 | Hartmann | F23C 99/001 |
| | | | 60/39.01 |
| 2008/0145802 A1 * | 6/2008 | Hammer | F23C 99/001 |
| | | | 431/2 |
| 2010/0257864 A1 * | 10/2010 | Prociw | F02C 3/145 |
| | | | 60/758 |
| 2011/0072786 A1 | 3/2011 | Tokuda et al. | |
| 2011/0126548 A1 * | 6/2011 | Hammer | F23C 99/001 |
| | | | 60/775 |
| 2012/0023950 A1 | 2/2012 | Weeks et al. | |
| 2012/0328996 A1 * | 12/2012 | Shi | F23R 3/007 |
| | | | 431/253 |
| 2013/0071794 A1 | 3/2013 | Colannino et al. | |
| 2013/0167554 A1 * | 7/2013 | Parsons | G01K 1/12 |
| | | | 60/803 |
| 2013/0230810 A1 | 9/2013 | Goodson et al. | |
| 2013/0260321 A1 | 10/2013 | Colannino et al. | |
| 2013/0291552 A1 * | 11/2013 | Smith | F23N 5/16 |
| | | | 60/779 |
| 2013/0323661 A1 | 12/2013 | Goodson et al. | |
| 2013/0333279 A1 | 12/2013 | Osler et al. | |
| 2013/0336352 A1 | 12/2013 | Colannino et al. | |
| 2014/0051030 A1 | 2/2014 | Colannino et al. | |
| 2014/0076212 A1 | 3/2014 | Goodson et al. | |
| 2014/0080070 A1 | 3/2014 | Krichtafovitch et al. | |
| 2014/0162195 A1 | 6/2014 | Lee et al. | |
| 2014/0170569 A1 | 6/2014 | Anderson et al. | |
| 2014/0170571 A1 | 6/2014 | Casasanta, III et al. | |
| 2014/0170575 A1 | 6/2014 | Krichtafovitch | |
| 2014/0170576 A1 | 6/2014 | Colannino et al. | |
| 2014/0196368 A1 | 7/2014 | Wiklof | |
| 2014/0208758 A1 | 7/2014 | Breidenthal et al. | |
| 2014/0212820 A1 | 7/2014 | Colannino et al. | |
| 2014/0216401 A1 | 8/2014 | Colannino et al. | |
| 2014/0227645 A1 | 8/2014 | Krichtafovitch et al. | |
| 2014/0255856 A1 | 9/2014 | Colannino et al. | |
| 2014/0272731 A1 | 9/2014 | Breidenthal et al. | |
| 2014/0295094 A1 | 10/2014 | Casasanta, III | |
| 2015/0079524 A1 | 3/2015 | Colannino et al. | |
| 2015/0107260 A1 | 4/2015 | Colannino et al. | |
| 2015/0118629 A1 | 4/2015 | Colannino et al. | |
| 2015/0121890 A1 | 5/2015 | Colannino et al. | |
| 2015/0140498 A1 | 5/2015 | Colannino | |
| 2015/0147704 A1 | 5/2015 | Krichtafovitch et al. | |
| 2015/0147705 A1 | 5/2015 | Colannino et al. | |
| 2015/0219333 A1 | 8/2015 | Colannino et al. | |
| 2015/0338089 A1 | 11/2015 | Krichtafovitch et al. | |
| 2015/0345780 A1 | 12/2015 | Krichtafovitch et al. | |
| 2015/0345781 A1 | 12/2015 | Krichtafovitch et al. | |
| 2015/0369477 A1 | 12/2015 | Karkow et al. | |
| 2016/0018103 A1 | 1/2016 | Karkow et al. | |
| 2016/0040872 A1 | 2/2016 | Colannino et al. | |
| 2016/0040946 A1 | 2/2016 | Goodson et al. | |
| 2016/0091200 A1 | 3/2016 | Colannino et al. | |
| 2016/0161115 A1 | 6/2016 | Krichtafovitch et al. | |
| 2016/0265765 A1 | 9/2016 | Ruiz et al. | |

FOREIGN PATENT DOCUMENTS

| | | | |
|---|---|---|---|
| EP | 2738460 | 6/2014 | |
| EP | 2738460 A1 * | 6/2014 | ............ F23C 99/001 |
| GB | 932955 | 7/1963 | |
| JP | 07-48136 | 2/1995 | |
| KR | 10-0925872 | 11/2009 | |
| WO | WO 1995/034784 | 12/1995 | |
| WO | WO 1996/001394 | 1/1996 | |
| WO | WO 2013/101488 | 7/2013 | |
| WO | WO 2013/181569 | 12/2013 | |

OTHER PUBLICATIONS

Timothy J.C. Dolmansley et al., "Electrical Modification of Combustion and the Affect of Electrode Geometry on the Field Produced," Modelling and Simulation in Engineering, May 26, 2011, 1-13, vol. 2011, Himdawi Publishing Corporation.

James Lawton and Felix J. Weinberg. "Electrical Aspects of Combustion." Clarendon Press, Oxford. 1969, p. 158.

(56) References Cited

OTHER PUBLICATIONS

PCT International Search Report and Written Opinion of International PCT Application No. PCT/US2014/045707 dated Nov. 20, 2014.

* cited by examiner

COMBUSTOR HAVING A NONMETALLIC BODY WITH EXTERNAL ELECTRODES

CROSS REFERENCE TO RELATED APPLICATIONS

The present application is a Continuation-in-Part Application which claims priority benefit under 35 U.S.C. § 120 from PCT Patent Application No. PCT/US2014/045707, entitled "COMBUSTOR HAVING A NONMETALLIC BODY WITH EXTERNAL ELECTRODES," filed Jul. 8, 2014 co-pending herewith; which claims priority benefit from U.S. Provisional Patent Application No. 61/860,202, entitled "COMBUSTOR HAVING A NONMETALLIC BODY WITH EXTERNAL ELECTRODES," filed Jul. 30, 2013, each of which, to the extent not inconsistent with the disclosure herein, is incorporated by reference.

SUMMARY

According to an embodiment, a combustor includes a nonmetallic combustor body defining at least a portion of a combustion volume aligned to carry a combustion reaction. The combustor body has an inner surface and an outer surface defining at least a portion of the combustion volume. The combustor body is aligned to carry a combustion reaction with flow in a longitudinal direction, the combustor body inner surface defining a lateral periphery of the combustion volume between an input end configured to receive combustion air and an output end configured to output combustion products. The combustor body can be configured to prevent passage of gas from inside the combustion volume to outside the combustion volume between the input end and the output end of the combustor body. At least one electrode is disposed outside the combustion volume with the nonmetallic combustor body lying at least partially between the at least one electrode and the combustion volume. A power supply is operatively coupled to the at least one electrode. The at least one electrode is configured to apply electrical energy to the combustion volume and the combustion reaction. For example, the electrode(s) can be configured to apply electrical energy by applying an electric field to the combustion volume, by creating an electric field effect in the combustion volume, and/or by providing charged particles to the combustion reaction. The combustor (or system of which the combustor is part) can be configured to provide a flow of cooling air along the outer surface of the combustor body. The nonmetallic combustor body can be configured to protect the at least one electrode from heat evolved from the combustion reaction.

According to an embodiment, a gas turbine includes a compressor configured to compress air, a combustor configured to receive compressed air from the compressor and support a combustion reaction using oxygen from the compressed air, and a turbine configured to receive heated combustion gas from the combustor and convert a portion of heat energy in the heated combustion gas into rotational kinetic energy. A turbine shaft may be operatively coupled to the turbine and the compressor and configured to transmit at least a portion of the rotational kinetic energy from the turbine to the compressor. The combustor includes a nonmetallic combustor body defining at least a portion of a combustion volume aligned to carry the combustion reaction. At least one electrode is disposed outside the combustion volume with the nonmetallic combustor body lying at least partially between the at least one electrode and the combustion volume. The at least one electrode is configured to apply electricity to the combustion volume. Additionally or alternatively, the at least one electrode can be configured to create electric field effect in the combustion volume. Additionally or alternatively, the at least one electrode can be configured to provide charged particles to the combustion volume. The gas turbine can be configured as a terrestrial power generator, a jet engine, or a turboprop engine, for example.

According to an embodiment, a burner includes a fuel or premixed fuel and oxidizer nozzle and a nonmetallic combustor body defining at least a portion of a combustion volume aligned to receive the fuel or fuel and oxidizer from the fuel or premixed fuel and oxidizer nozzle and to hold a combustion reaction. At least one electrode is disposed outside the combustion volume with the nonmetallic combustor body lying at least partially between the at least one electrode and the combustion volume. The at least one electrode is configured to apply electricity to the combustion volume. Additionally or alternatively, the at least one electrode can be configured to create electric field effect in the combustion volume. Additionally or alternatively, the at least one electrode can be configured to provide charged particles to the combustion volume. The burner is configured to provide heat to an industrial process or as a heat source for a boiler, for example.

According to an embodiment, a method for operating a combustor includes supporting at least a portion of a combustion reaction in a combustion volume defined by a nonmetallic combustor body, supporting at least one electrode outside the combustion volume with the nonmetallic combustor body lying at least partially between the at least one electrode and the combustion volume, and applying electricity to the combustion volume with the at least one electrode.

According to another embodiment, a method for operating a combustor includes supporting at least a portion of a combustion reaction in a combustion volume defined by a nonmetallic combustor body, supporting at least one electrode outside the combustion volume with the nonmetallic combustor body lying at least partially between the at least one electrode and the combustion volume, and providing charged particles to the combustion volume with the at least one electrode.

DETAILED DESCRIPTION

Figure 1:
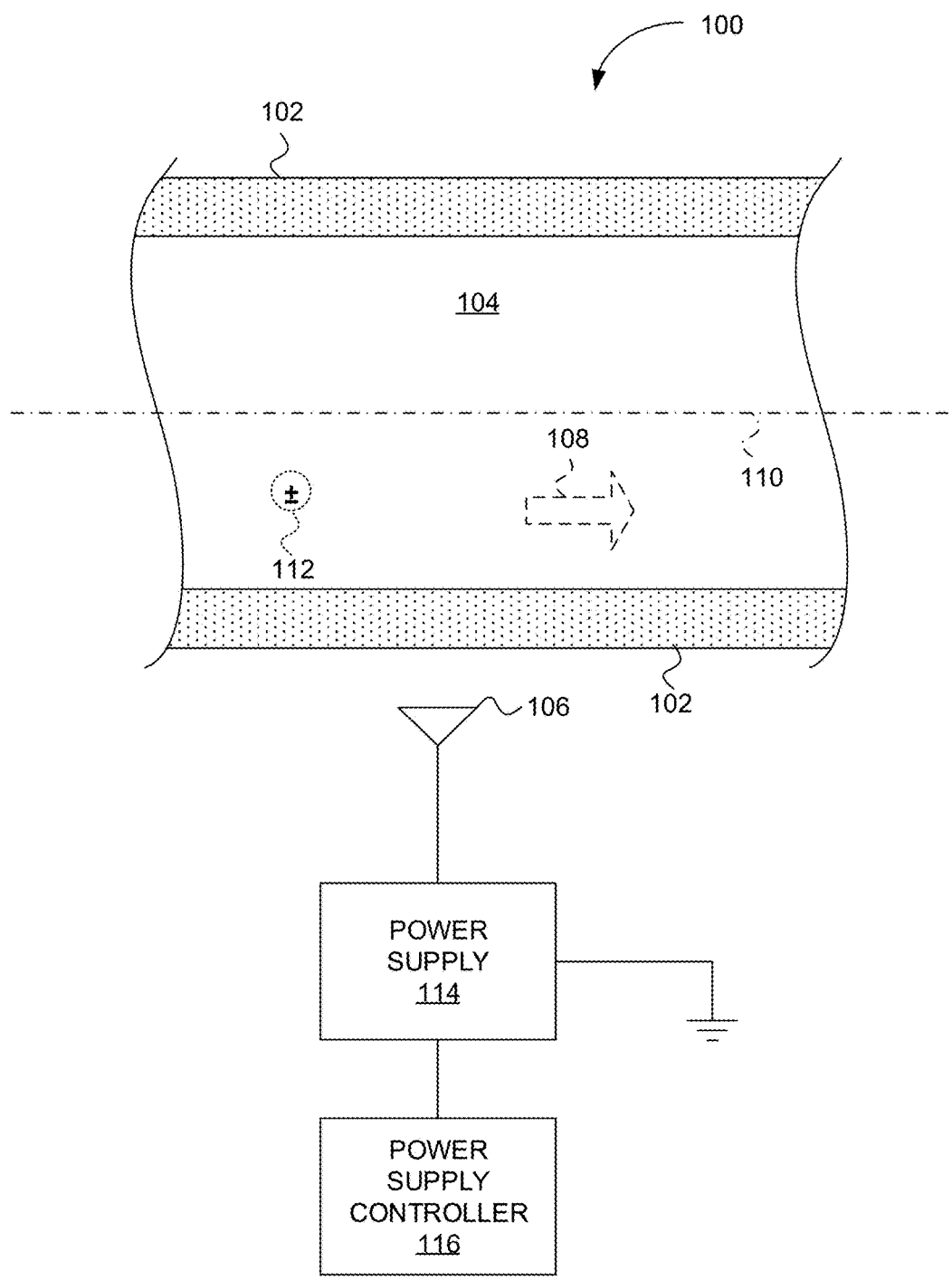
FIG. 1 is a sectional diagram of a combustor including a nonmetallic combustor body and at least one electrode disposed outside the nonmetallic combustor body, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

While the disclosure herein often refers to "at least one electrode," it shall be understood that a single electrode, when operated in a DC mode, may have no net effect. Accordingly, it is generally true that at least one counter electrode is also present in the system. The at least one counter electrode can, for example, include a conductive case or other part operatively coupled to earth ground. Additionally or alternatively, the at least one counter electrode can be operatively coupled to a ground node of a power supply. Additionally or alternatively, the at least one counter electrode can be operatively coupled to a voltage node of a power supply configured to carry a voltage different than a voltage carried by a first node of the power supply operatively coupled to "the at least one electrode."

FIG. 1 is a sectional diagram of a combustor 100, according to an embodiment. The combustor 100 includes a nonmetallic combustor body 102, which defines at least a portion of a combustion volume 104. The combustion volume 104 is shown in FIG. 1 in a side sectional view. The nonmetallic combustor body 102 and the combustion volume 104 are aligned and/or configured to carry and/or direct a combustion reaction 108. The combustor 100 also includes at least one electrode 106 disposed outside the combustion volume 104. The combustor 100 is configured with the nonmetallic combustor body 102 lying at least partially between the at least one electrode 106 and the combustion volume 104. In various examples, the at least one electrode 106 can be configured to apply electricity to the combustion volume 104. In some examples, the at least one electrode 106 can be configured to create electric field effect in the combustion volume 104. In several examples, the at least one electrode 106 can be configured to provide charged particles to the combustion volume 104.

The combustor 100 can further include one or more fuel nozzles configured to inject fuel into the combustion volume 104 to support the combustion reaction 108.

The nonmetallic combustor body 102 can include an inner surface and an outer surface, which define at least a portion of a combustion volume aligned to carry a combustion reaction with flow in a longitudinal direction. The nonmetallic combustor body 102 can define the longitudinal direction to be linear or curvilinear. The inner surface of the combustor body can define a lateral periphery of the combustion volume between an input end and an output end. The input end can be configured to receive combustion air, and the output end can be configured to output combustion products. The nonmetallic combustor body 102 can be configured to prevent passage of gas from inside the combustion volume to outside the combustion volume between the input end and the output end of the combustor body. The combustor 100 can be configured to provide a flow of cooling air along the outer surface of the combustor body.

The nonmetallic combustor body 102 can be configured to protect or shield the electrode(s) 106 from heat evolved from the combustion reaction 108. Additionally or alternatively, the nonmetallic combustor body 102 can be configured to provide an aerodynamic effect to reactants, combustion reaction, and/or combustion products in the combustion volume 104. For example, the nonmetallic combustor body 102 can contain a lateral extent of the combustion reaction 108 and/or may reduce or stop diffusion of ambient gas (e.g., air or flue gas) into a premixed fuel and oxidant mixture.

According to an embodiment, the nonmetallic combustor body 102 is substantially electrically transparent. As used herein, a material can be referred to as "electrically transparent" in relation to a dielectric constant of the material. The dielectric constant for a material, K (kappa), is calculated by dividing the electrical permittivity of the material by the vacuum permittivity. Low dielectric constant materials are regarded as electrically transparent in that an electric field can be applied through the material. In many examples, the nonmetallic combustor body 102 includes a material having a dielectric constant less than about 20. In multiple examples, the nonmetallic combustor body 102 includes a material having a dielectric constant less than about 12.

The nonmetallic combustor body 102 can be electrically insulating. Various nonmetallic materials are contemplated. For example, the nonmetallic combustor body 102 can include an aluminum oxide such as alumina. In another example, the nonmetallic combustor body 102 can include a silicon oxide such as silica. In other examples, the nonmetallic combustor body is formed at least partly from fused quartz glass, sapphire, titanium oxide, mullite, cordierite or sapphire. In some embodiments, the nonmetallic combustor body can include an aerogel, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), or tantalum carbide (TaC). Additionally or alternatively, the nonmetallic combustor body can be formed from a material that is semiconducting at room temperature and/or operating temperature of the combustor body. For example, such materials can include silicon, silicon carbide, or germanium.

In an embodiment, at least a portion of the nonmetallic combustor body 102 includes an aerogel. The aerogel can be formed as a layer on an inner surface of the nonmetallic combustor body 102 positioned between the combustion volume 104 and a structural portion of the combustor body to provide thermal insulation for the nonmetallic combustor body 102 that defines the combustion volume 104. In another embodiment, the aerogel can be formed as a layer on an outer surface of the nonmetallic combustor body 102 positioned outside the combustion volume 104 and between the combustor body 102 and the electrode(s) 106.

In some examples, the nonmetallic combustor body 102 includes a cylindrical wall such that the combustion volume 104 defined by the nonmetallic combustor body 102 is substantially cylindrical. In other examples, the combustion volume 104 is toric. The combustor 100 can include a shaft coaxial to the nonmetallic combustor body 102. In another embodiment, the nonmetallic combustor body can form a cross section that is elliptical (e.g., circular) or polyhedral in cross section.

According to an embodiment, the nonmetallic combustor body 102 is aligned and/or configured to carry and/or direct the combustion reaction 108 in the form of a continuous flow. FIG. 1 depicts an axis 110 of the nonmetallic combustor body 102. The combustion reaction 108 is supported as a continuous or pulsed flow of fuel and oxidant parallel to the axis 110 of the nonmetallic combustor body 102.

In an embodiment, the combustion reaction 108 at least intermittently carries particles having a charge 112. The electrode(s) 106 can be configured to carry a voltage selected to electrically interact with the charged particles 112. For example, the at least one electrode 106 can be configured to carry a voltage configured to impart on the charged particles 112 an electric field selected to move the charged particles at a velocity component at an angle off-axis to the longitudinal direction 110 defined by the nonmetallic combustor body 102. As used herein, the term "off-axis" refers to an angle that is a value other than zero degrees or 180 degrees relative to the longitudinal direction defined as a main flow axis 110 through the combustor body 102. Thus, the electrically-driven velocity component can be depicted as a vector positioned at an angle to the axis 110. One or more aerodynamic shapes formed in the combustor body 102 can cause aerodynamic effects in gas flow that operate in concert with electrically-driven effects.

Referring again to FIG. 1, in various examples, the combustor 100 can include a power supply 114 operatively coupled to the at least one electrode 106. The power supply 114 can be configured to at least intermittently apply one or more voltages to the at least one electrode 106. In several examples, the combustor 100 includes a power supply controller 116 operatively coupled to the power supply 114. The power supply controller 116 can be configured to control the one or more voltages at least intermittently applied by the power supply 114 to the at least one electrode 106. Additionally or alternatively, the power supply controller 116 can be configured to cause the power supply 114 to at least intermittently apply a substantially constant voltage to the at least one electrode 106. In one embodiment, the power supply controller 116 can be configured to cause the power supply 114 to apply a DC voltage to the at least one electrode 106.

In another embodiment, the power supply controller 116 can be configured to cause the power supply 114 to apply a time-varying voltage to the at least one electrode 106. For example, the time-varying voltage can include an alternating current voltage. In various examples, the time-varying voltage includes a periodic voltage waveform having a frequency in a range from about 50 Hertz to about 10,000 Hertz. According to some embodiments, the time-varying voltage includes a periodic voltage waveform having a frequency in a range from about 200 Hertz to about 800 Hertz. In some examples, the time-varying voltage includes, for example, a square waveform, a sine waveform, a triangular waveform, a sawtooth waveform, a logarithmic waveform, an exponential waveform, a wavelet waveform, truncated versions thereof, combinations thereof, or the like. In several examples, the time-varying voltage includes a waveform having a potential amplitude in a range from about ±1000 Volts to about ±115,000 Volts. According to embodiments, the time-varying voltage includes a waveform having a potential amplitude in a range from about ±8000 Volts to about ±40,000 Volts. In many examples, the time-varying voltage includes a DC offset voltage.

The electrical energy applied to the combustion volume 104 by the at least one electrode 106 can be selected to increase a rate of reaction of the combustion reaction 108. In some examples, the electric field effect created in the combustion volume 104 by the at least one electrode 106 can be selected to increase the rate of reaction of the combustion reaction 108. The charged particles provided to the combustion volume 104 by the at least one electrode 106 can be selected to increase the rate of reaction of the combustion reaction 108. The rate of reaction of the combustion reaction 108 can be increased and/or decreased. In many examples, the rate of reaction of the combustion reaction 108 is decreased.

The electrical energy applied to the combustion volume 104 can be selected to decrease a given amount of heat evolved from the combustion reaction 108 compared to not applying the electrical energy to the combustion volume 104. In an embodiment, the electrical energy can include an electric field effect created in the combustion volume 104 selected to decrease or increase a given amount of heat evolved from the combustion reaction 108 compared to not creating the electric field effect in the combustion volume 104. In another embodiment, the electrical energy can include providing charged particles to the combustion volume 104 by the at least one electrode 106.

The electrical energy applied to the combustion volume 104 can be selected to increase mixing in the combustion reaction 108 compared to not applying the electrical energy to the combustion volume 104.

The electrical energy applied to the combustion volume 104 can be selected to decrease an amount of oxides of nitrogen (NOx) evolved from the combustion reaction 108 compared to not applying the electrical energy to the combustion volume 104. The electrical energy applied to the combustion volume 104 can be additionally or alternatively be selected to increase or decrease an amount of carbon monoxide (CO) evolved from the combustion reaction 108 compared to not applying the electrical energy to the combustion volume 104. For example, in a combustion process where flue gas is output to the atmosphere, it is generally desirable to minimize CO output. Alternatively, in a combustion process where flue gas is intended to be a fuel gas for further processing or oxidation, it can be advantageous to maximize CO output to a subsequent process.

Figure 2:
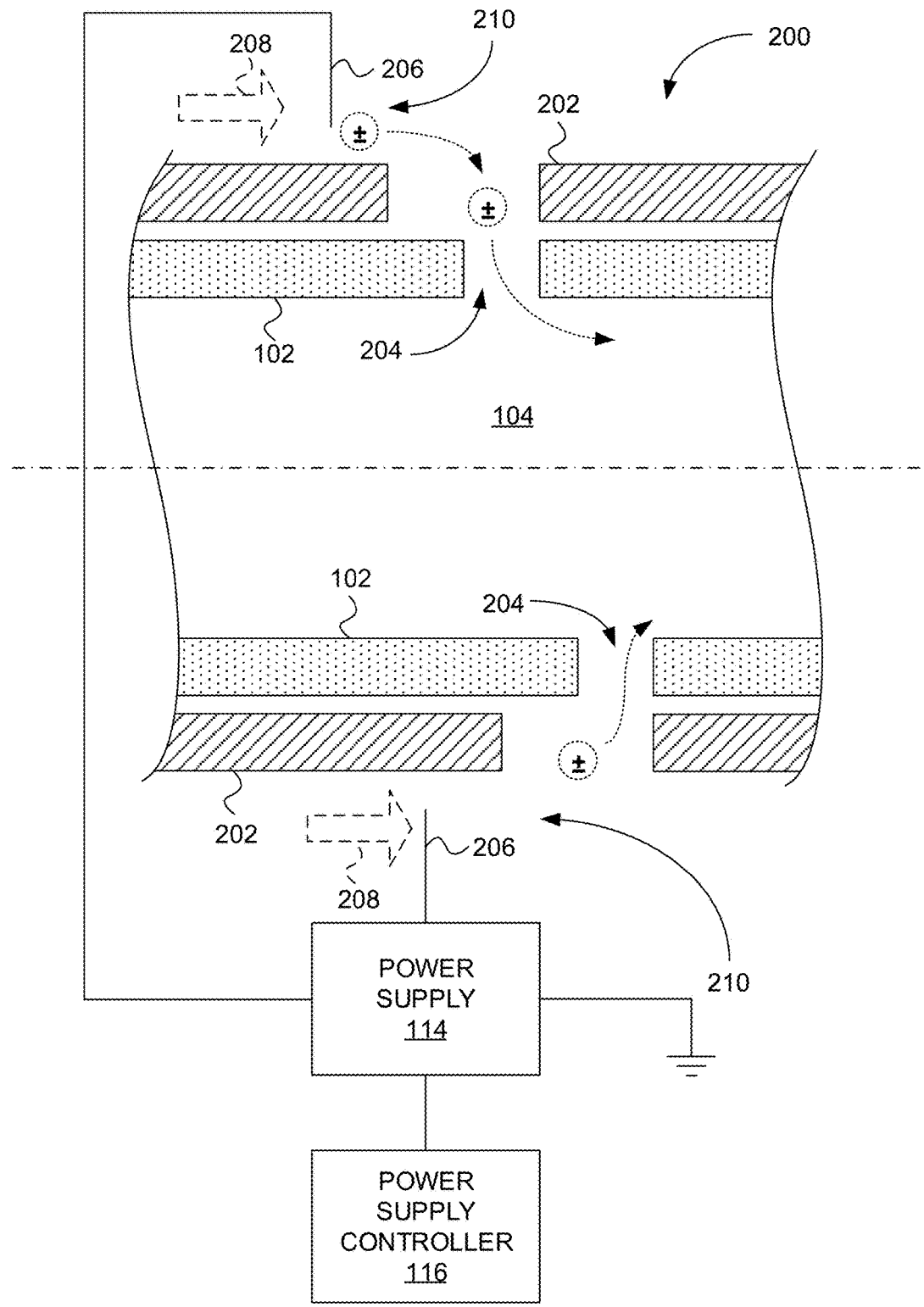
FIG. 2 is a sectional diagram of a combustor including a nonmetallic combustor body and an electrically conductive shield disposed between a portion of an outer surface of the nonmetallic combustor body and at least one electrode, according to an embodiment.

FIG. 2 is a sectional diagram of a combustor 200, according to an embodiment. The combustor 200 includes the nonmetallic combustor body 102. The combustor 200 can also include an electrically conductive shield 202. As depicted in FIG. 2, the electrically conductive shield 202 is located between a portion of an outer surface of the nonmetallic combustor body 102 and at least one electrode 206.

The combustor 200 includes at least one port 204 formed in the nonmetallic combustor body 102. The at least one port 204 can be configured to allow passage of a flow of air or flue gas 208. The flow of air or flue gas 208 travels from a volume 210 proximate to the at least one electrode 206 into the combustion volume 104. In some examples, the at least one electrode 206 includes a corona electrode 206 configured to eject ions into the flow of oxidant or combustion fluid 208. The at least one port 204 can be configured to allow the passage of the ions from the volume 210 proximate to the at least one electrode 206 into the combustion volume 104.

Figure 3:
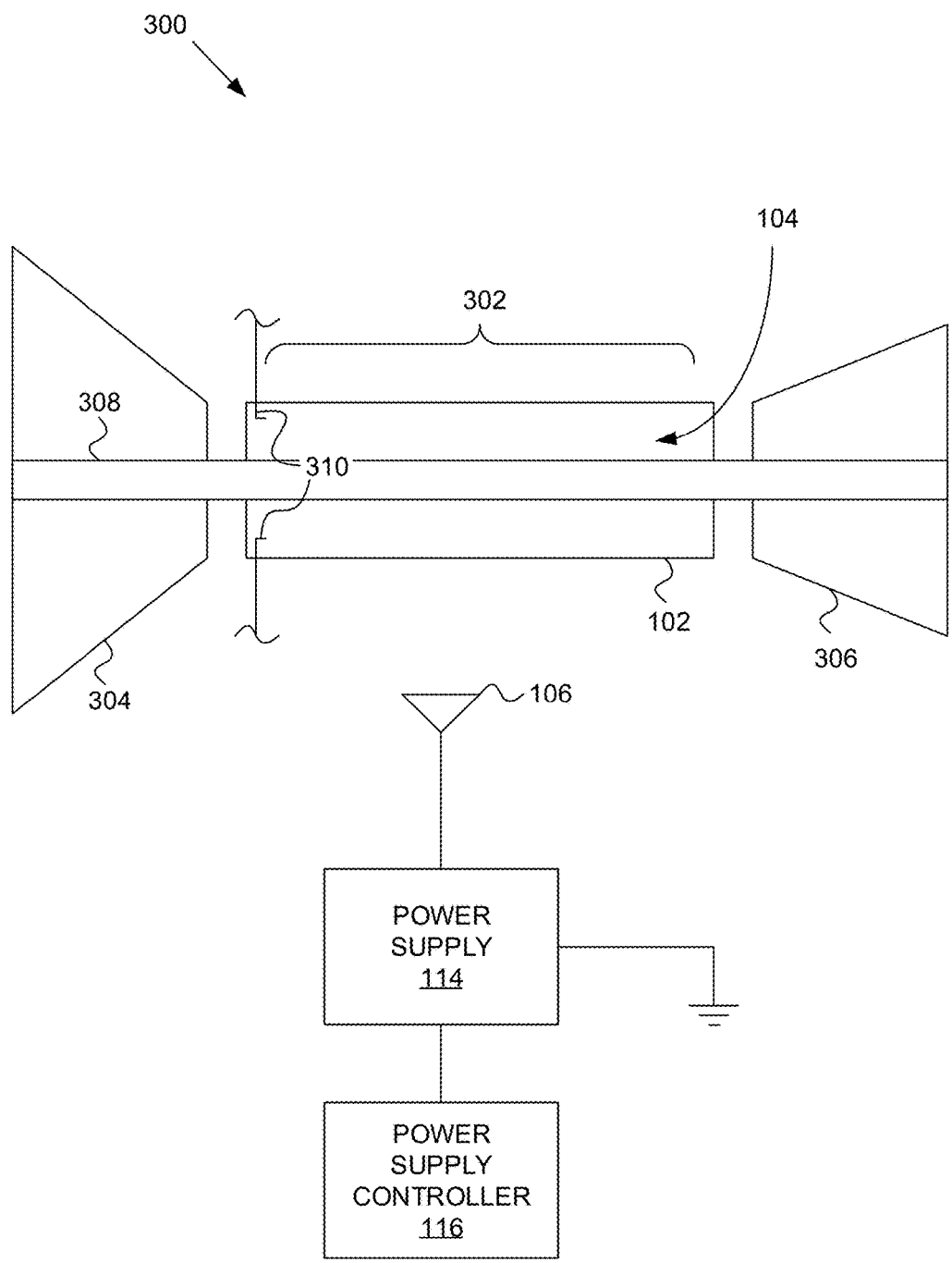
FIG. 3 is a diagram of a gas turbine apparatus including a combustor and a compressor, according to an embodiment.
Figure 4:
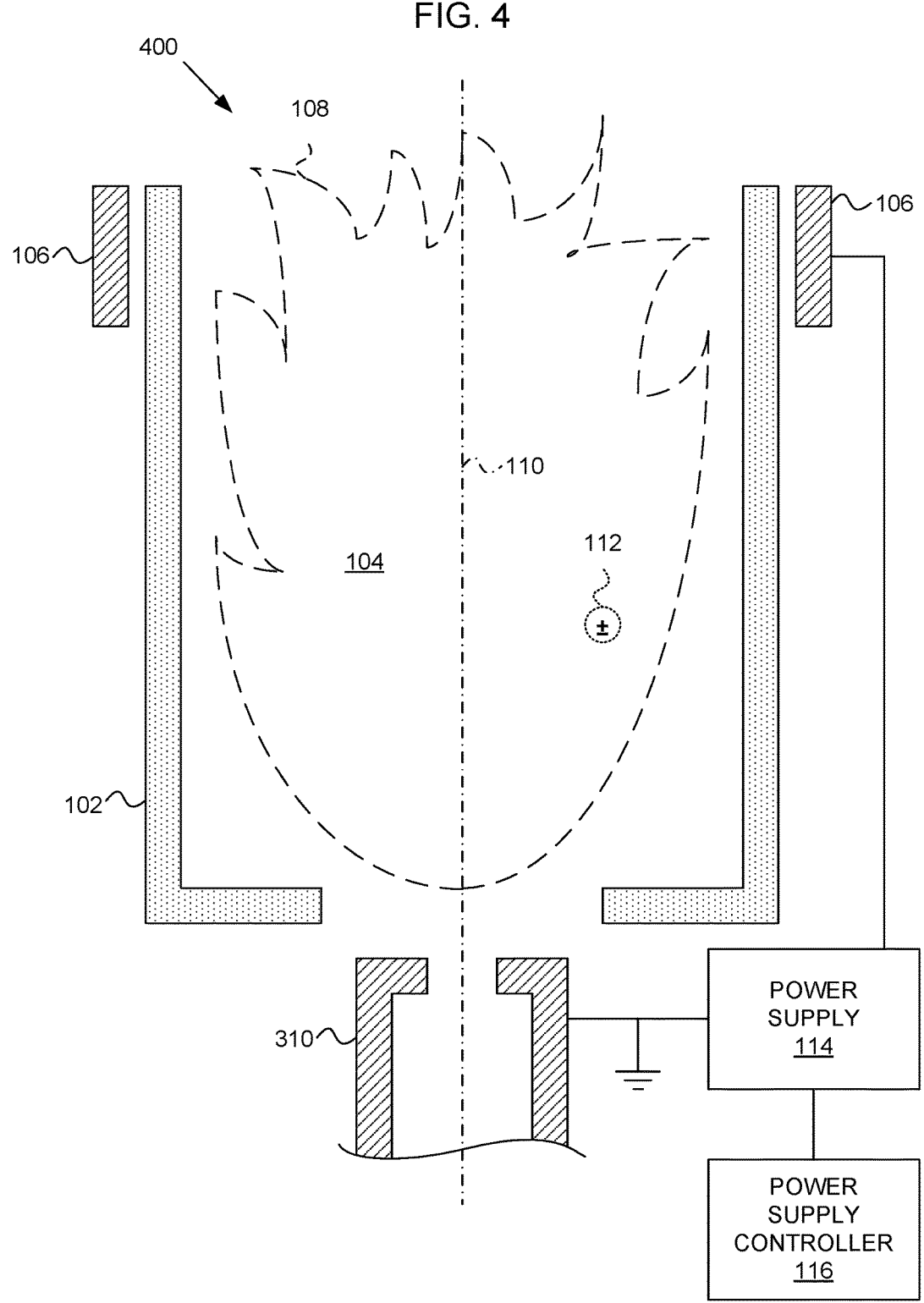
FIG. 4 is a diagram of a burner including a nonmetallic combustor body and at least one electrode disposed outside the nonmetallic combustor body, according to an embodiment.

In various examples of the combustor 200, the nonmetallic combustor body 102 can be configured as part of an industrial burner, for example, burner 400 as depicted in FIG. 4. In some examples of the combustor 200, the nonmetallic combustor body 102 can be configured as at least a portion of a gas turbine combustor, for example, gas turbine combustor 302 as depicted in FIG. 3.

FIG. 3 is a schematic representation of a gas turbine apparatus 300, according to an embodiment. The gas turbine apparatus 300 includes a gas turbine combustor 302. The gas turbine apparatus 300 also includes a compressor 304 configured to compress air. The gas turbine combustor 302 is configured to receive compressed air from the compressor 304. The gas turbine combustor 302 is configured to support the combustion reaction 108 in FIG. 1 using oxygen from the compressed air.

The nonmetallic combustor body 102 can include an inner surface and an outer surface, which define at least a portion of a combustion volume aligned to carry a combustion reaction with flow in a longitudinal direction. The nonmetallic combustor body 102 can define the longitudinal direction to be linear or curvilinear. The inner surface of the combustor body can define a lateral periphery of the combustion volume between an input end and an output end. The input end can be configured to receive combustion air, and the output end can be configured to output combustion products. The combustor body 102 can be configured to prevent passage of gas from inside the combustion volume to outside the combustion volume between the input end and the output end of the combustor body 102. The combustor 302 can be configured to provide a flow of cooling air along the outer surface of the combustor body 102.

The gas turbine apparatus 300 also includes a turbine 306 configured to receive heated combustion gas from the nonmetallic combustor body 102. The turbine 306 can be configured to convert a portion of heat energy in the heated combustion gas into rotational kinetic energy. The gas turbine apparatus 300 also includes a turbine shaft 308 operatively coupled to the turbine 306 and the compressor 304 and configured to transmit at least a portion of rotational kinetic energy from the turbine 306 to the compressor 304.

The gas turbine combustor 302 can include the nonmetallic combustor body 102 defining at least a portion of the combustion volume 104 aligned and/or configured to carry and/or direct the combustion reaction 108. The gas turbine apparatus 300 can include the at least one electrode 106 located outside the nonmetallic combustor body 102 and/or outside the combustion volume 104 as depicted in FIG. 3. In some examples, the nonmetallic combustor body 102 can lie or be located at least partially between the at least one electrode 106 and the combustion volume 104.

The at least one electrode 106 can be configured to apply the electrical energy to the combustion volume 104 included in the gas turbine apparatus 300. In some examples, the at least one electrode 106 can be configured to create the electric field effect in the combustion volume 104 included in the gas turbine apparatus 300. The at least one electrode 106 can be configured to provide the charged particles to the combustion volume 104 included in the gas turbine apparatus 300.

The gas turbine apparatus 300 also includes one or more fuel nozzles 310 configured to inject a fuel into the gas turbine apparatus 300, for example into the combustion volume 104. The one or more fuel nozzles 310 can be configured to inject the fuel to support the combustion reaction 108.

The nonmetallic combustor body 102 included in the gas combustion apparatus 300 can be configured to protect or shield the at least one electrode 106 from heat evolved from the combustion reaction 108.

The nonmetallic combustor body 102 included in the gas combustion apparatus 300 includes a material having a dielectric constant less than about 20. In multiple examples, the nonmetallic combustor body 102 includes a material having a dielectric constant less than about 12. In numerous examples, the nonmetallic combustor body 102 can be substantially electrically transparent as described herein.

The nonmetallic combustor body 102 included in the gas combustion apparatus 300 can be electrically insulating. In some examples, the nonmetallic combustor body 102 includes alumina. In several examples, the nonmetallic combustor body 102 includes silica. In some embodiments, the nonmetallic combustor body can be formed at least partly from an aerogel, fused quartz glass, sapphire, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), or tantalum carbide (TaC). In some embodiments, the nonmetallic combustor body can be formed at least partly from an ultrahigh temperature ceramic material.

The combustion reaction 108 included in the gas combustion apparatus 300 can be configured to at least intermittently carry particles having a charge. In some examples, the at least one electrode 106 can be configured to carry a voltage selected to electrically interact with the charged particles. In several examples, the at least one electrode 106 can be configured to carry a voltage configured to impart on the charged particles 112 an electric field selected to move the charged particles at a velocity component at an angle off-axis to the longitudinal direction 110 defined by the nonmetallic combustor body 102.

The gas turbine combustor 302 can include a power supply 114 operatively coupled to the at least one electrode 106. In some examples, the power supply 114 can be configured to at least intermittently apply one or more voltages to the at least one electrode 106. In several examples, the gas turbine combustor 302 includes a power supply controller 116 operatively coupled to the power supply 114. The power supply controller 116 can be configured to control the one or more voltages at least intermittently applied by the power supply 114 to the at least one electrode 106. The power supply controller 116 can be configured to cause the power supply 114 to at least intermittently apply a substantially constant voltage to the at least one electrode 106. In an embodiment, the power supply controller 116 can be configured to cause the power supply 114 to apply a DC voltage to the at least one electrode 106. In another embodiment, the power supply controller 116 can be configured to cause the power supply 114 to apply a time-varying voltage to the at least one electrode 106.

Other aspects of operation of the combustor 302 are described above in conjunction with FIGS. 1 and 2.

The gas turbine 306 can be configured to output at least a portion of the rotational kinetic energy to a mobile electrical power generation system, for example, a turbine-electric powered vehicle. Examples of vehicles include a tank, a ship, a boat, a train engine, a truck, a tractor, an automobile, a motorized bicycle, a motorcycle, a bus, a helicopter, an airplane, or the like. The gas turbine 306 can be configured to output at least a portion of the rotational kinetic energy to a stationary electrical power generation system, for example a turbine-electrical power generator. Examples of stationary power generation systems include an electrical power plant, an industrial manufacturing process, a compressed oxidant energy storage process, or the like. The gas turbine 306 can be configured to output at least a portion of the rotational kinetic energy to a mobile mechanical power generation system, for example, a turbine powered vehicle. In some examples, the gas turbine 306 can be configured to output at least a portion of the rotational kinetic energy to a stationary mechanical power generation system, for example a turbine powered factory process. The gas turbine 306 can be configured to output at least a portion of the rotational kinetic energy to a mobile hybrid power generation system, for example, a turbine powered vehicle with an electrical storage cell subsystem. In some examples, the gas turbine 306 can be configured to output at least a portion of the rotational kinetic energy to a stationary hybrid power generation system, for example a turbine powered power station with an electrical storage cell subsystem.

The gas turbine 306 can be configured to output at least a portion of the rotational kinetic energy to a propeller as a portion of a turboprop engine. In some examples, the gas turbine 306 can be configured to output thrust as a portion of a jet engine.

FIG. 4 is a diagram of a burner 400 including a nonmetallic combustor body 102 and at least one electrode 106 disposed outside the nonmetallic combustor body 102, according to an embodiment. The burner 400 includes a fuel nozzle 310 configured to deliver a fuel or a premixture of the fuel and an oxidizer. The burner 400 includes the nonmetallic combustor body 102. The nonmetallic combustor body 102 included in the burner 400 defines at least a portion of the combustion volume. The nonmetallic combustor body 102 included in the burner 400 is aligned to receive the fuel or the premixture of the fuel and the oxidizer from the fuel nozzle 310. The nonmetallic combustor body 102 included in the burner 400 can be configured to hold the combustion reaction 108 in the combustion volume 104.

The burner 400 also includes the at least one electrode 106. The at least one electrode 106 included in the burner 400 can be positioned outside the combustion volume 104, with the nonmetallic combustor body 102 lying at least partially between the at least one electrode 106 and the combustion volume 104. In various examples, the at least one electrode 106 included in the burner 400 is configured to apply the electrical energy to the combustion volume 104. For example, the at least one electrode can apply an electric field across the combustion volume 104, create the electric field effect in the combustion volume 104, or provide the charged particles to the combustion volume 104.

The nonmetallic combustor body 102 included in the burner 400 can be configured to protect or shield the at least one electrode 106 from heat evolved from the combustion reaction 108.

The nonmetallic combustor body 102 included in the burner 400 can be substantially electrically transparent. For example, the nonmetallic combustor body 102 included in the burner 400 can include a material having a dielectric constant less than about 20. The nonmetallic combustor body 102 included in the burner 400 can additionally or alternatively include a material having a dielectric constant less than about 12.

The nonmetallic combustor body 102 included in the burner 400 can be electrically insulating. In some examples, the nonmetallic combustor body 102 included in the burner 400 includes alumina. In some embodiments, the nonmetallic combustor body can be formed at least partly from an aerogel, fused quartz glass, sapphire, hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), or tantalum carbide (TaC). In several examples, the nonmetallic combustor body 102 included in the burner 400 includes silica.

In further examples, at least a portion of the nonmetallic combustor body 102 included in the burner 400 includes an aerogel. The aerogel can be formed as a layer on an outer surface of the nonmetallic combustor body 102 included in the burner 400. The aerogel can be positioned opposite an inner surface of the nonmetallic combustor body 102 that defines the combustion volume 104 included in the burner 400.

In some examples, the nonmetallic combustor body 102 included in the burner 400 includes a cylindrical wall. In further examples, the combustion volume 104 defined by the nonmetallic combustor body 102 included in the burner 400 is substantially cylindrical. The combustion volume 104 included in the burner 400 can be toric or substantially toric.

The nonmetallic combustor body 102 included in the burner 400 can be aligned and/or configured to carry and/or direct the combustion reaction 108 in the form of a continuous flow. FIG. 4 depicts an axis 110 of the nonmetallic combustor body 102 included in the burner 400. In various examples, the combustion reaction 108 in the form of the continuous flow is parallel to the axis 110 of the nonmetallic combustor body 102 included in the burner 400.

The combustion reaction 108 in the burner 400 can be configured to at least intermittently carry the particles having a charge 112. In some examples, the at least one electrode 106 included in the burner 400 is configured to carry a voltage selected to electrically interact with the charged particles 112. In several examples, the at least one electrode 106 included in the burner 400 is configured to carry a voltage configured to impart on the charged particles 112 an electric field selected to move the charged particles at a velocity component at an angle off-axis to the longitudinal direction 110 defined by the nonmetallic combustor body 102.

A power supply 114 is operatively coupled to the at least one electrode 106. The power supply 114 can be configured to at least intermittently apply one or more voltages to the at least one electrode 106. In an embodiment, the power supply controller 116 is configured to cause the power supply 114 to at least intermittently apply a substantially constant voltage to the at least one electrode 106. In other words, the power supply controller 116 can be configured to cause the power supply 114 to apply a DC voltage to the at least one electrode 106. In another embodiment, the power supply controller 116 can be configured to cause the power supply 114 to apply a time-varying voltage to the at least one electrode 106.

The electrical energy applied to the combustion volume 104 by the at least one electrode 106 can be selected to increase a rate of reaction of the combustion reaction 108. The electrical energy applied to the combustion volume 104 can be selected to increase mixing in the combustion reaction 108 compared to not applying the electrical energy to the combustion volume 104.

The electrical energy applied to the combustion volume 104 included in the burner 400 can be selected to decrease an amount of NOx evolved from the combustion reaction 108 compared to not applying the electrical energy to the combustion volume 104. Additionally or alternatively, the electrical energy applied to the combustion volume 104 included in the burner 400 can be selected to decrease an amount of CO evolved from the combustion reaction 108 compared to not applying the electrical energy to the combustion volume 104. Similarly, the application of electrical energy can be used to decrease the evolution of particulates (e.g., as visible smoke) from the combustion reaction 108.

In an embodiment, the burner 400 includes an electrically conductive shield 202 (see FIG. 2) located in the burner 400 between a portion of an outer surface of the nonmetallic combustor body 102 and the at least one electrode 106. In an embodiment, the at least one electrode 106 includes a corona electrode 206 (see FIG. 2) configured to eject ions into a flow of air or flue gas 208 along the outer surface of the nonmetallic combustor body 102.

The nonmetallic combustor body can include at least one port 204 formed in the nonmetallic combustor body 102 configured to allow passage of the flow of air or flue gas 208 from the volume 210 proximate to the at least one electrode 106 into the combustion volume 104. The at least one port 204 included in the burner 400 is configured to allow the passage of the ions from the volume 210 proximate to the at least one electrode 106 into the combustion volume 104.

The burner 400 can be configured as an industrial burner for providing heat to an industrial process. In some examples, the burner 400 is configured as a heat source for a boiler. For example, the burner can be configured as a heat source for a domestic or industrial hot water heater, or a domestic or industrial hot water or steam building heating system.

Figure 5:
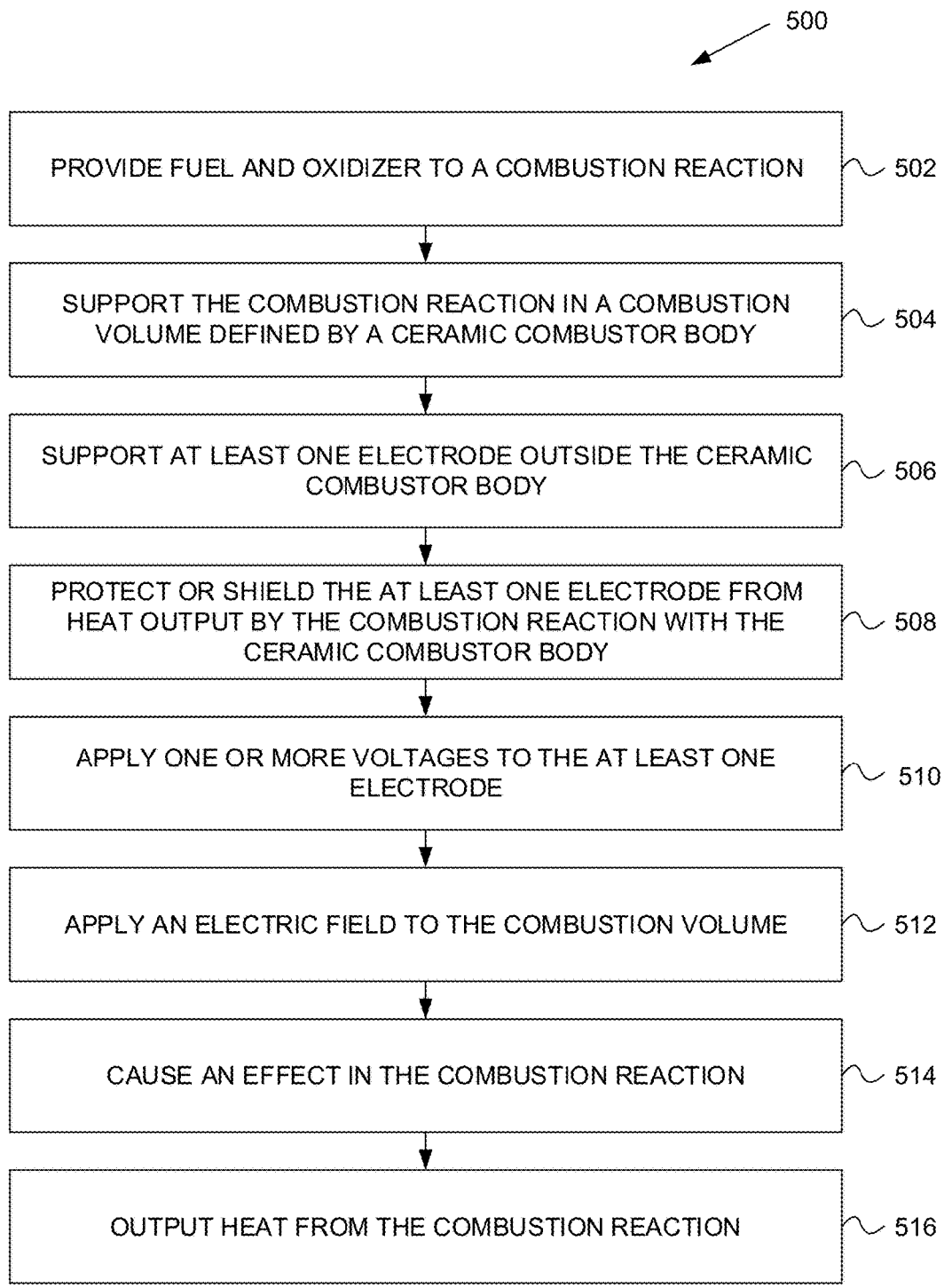
FIG. 5 is a flow chart showing a method for operating a combustor including a nonmetallic combustor body, according to an embodiment.

FIG. 5 is a flow chart showing a method 500 for operating a combustor including a nonmetallic combustor body. The method 500 includes step 504, wherein at least a portion of the combustion reaction is supported in the combustion volume defined by the nonmetallic combustor body. The method 500 also includes step 506, wherein at least one electrode is supported outside the combustion volume. In various examples, the nonmetallic combustor body lies at least partially between the at least one electrode and the combustion volume. The method 500 also includes step 512, wherein electricity is applied to the combustion volume with the at least one electrode.

The method 500 can include step 502, wherein the fuel and/or the oxidizer is provided to the combustion reaction. In some examples, the step for providing the fuel can include providing a hydrocarbon gas, a hydrocarbon liquid, or a powdered coal. In several examples, the method 500 includes step 508, wherein the at least one electrode is protected or shielded from heat evolved from the combustion reaction with the nonmetallic combustor body.

In further examples of the method 500, the nonmetallic combustor body is substantially electrically transparent. In some examples of the method 500, the nonmetallic combustor body can include the material having a dielectric constant less than 20. In several examples of the method 500, the nonmetallic combustor body can include the material having a dielectric constant less than 12. In many examples of the method 500, the nonmetallic combustor body can be electrically insulating.

In various examples, the method 500 includes a step wherein the combustion reaction at least intermittently carries particles having a charge. In some examples, the method 500 includes step 514, wherein a measurable effect in the combustion reaction is created. Step 514 can include causing electrical interaction between the electrical energy and the charged particles. In several examples of the method 500, the step for electrically interacting the electrical energy with the particles having a net charge can include imparting on the charged particles 112 an electric field selected to move the charged particles at a velocity component at an angle off-axis to the longitudinal direction 110 defined by the nonmetallic combustor body 102.

In various examples, the method 500 includes step 510, wherein one or more voltages are at least intermittently applied to the at least one electrode. In some examples, the method 500 includes a step wherein the one or more voltages at least intermittently applied to the at least one electrode is controlled. In several examples of the method 500, the step for controlling the one or more voltages can include causing the power supply to at least intermittently apply a substantially constant voltage to the at least one electrode. For example, the step of controlling the one or more voltages can include causing the power supply to apply a DC voltage to the at least one electrode. Alternatively, the step for controlling the one or more voltages can include causing the power supply to apply a time-varying voltage to the at least one electrode.

In step 514 an effect is created in the combustion reaction responsive to the application of the electrical energy. Step 514 can include increasing a rate of reaction of the combustion reaction. In various examples, step 514 can include decreasing a size of the combustion volume for a given amount of heat evolved from the combustion reaction compared to not applying the electrical energy. In some examples, step 514 can include increasing mixing in the combustion reaction. Step 514 can include decreasing an amount of NOx evolved from the combustion reaction. In many examples, step 514 can include decreasing an amount of CO evolved from the combustion reaction. Step 514 can be configured to create any effect described herein associated with applying the electrical energy, the electric field effect, or the charged particles to the combustion volume or the combustion reaction.

In various examples, the method 500 includes step 516, wherein heat is directed from the combustion reaction to an industrial process or a boiler. Step 516 can include directing heat from the combustion reaction to a gas turbine.

Figure 6:
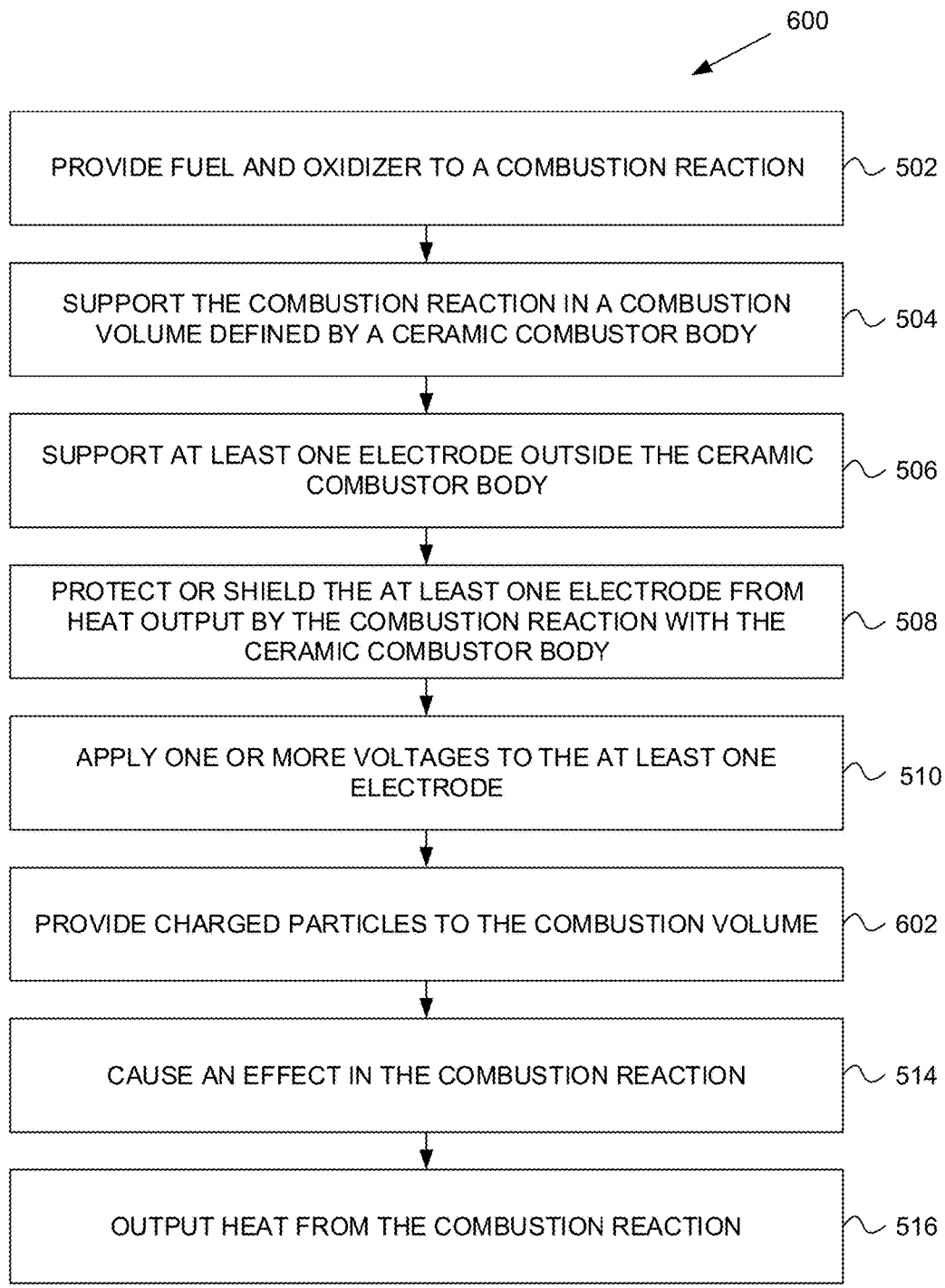
FIG. 6 is a flow chart showing a method for operating a combustor including a nonmetallic combustor body, according to another embodiment.

FIG. 6 is a flow chart showing a method 600 for operating a combustor that includes a nonmetallic combustor body. The method 600 for operating the combustor can include a step for supporting at least a portion of the combustion reaction in the combustion volume defined by the nonmetallic combustor body. The method 600 for operating the combustor can include step 506, wherein the at least one electrode is supported outside the combustion volume. The nonmetallic combustor body can lie at least partially between the at least one electrode and the combustion volume. The method 600 for operating the combustor can include step 602, wherein charged particles are provided to the combustion volume with the at least one electrode.

In various examples, the method 600 for operating the combustor includes step 502, wherein the fuel and/or the oxidizer is provided to the combustion reaction. In some examples of the method 600 for operating the combustor, the step for providing fuel can include providing a hydrocarbon gas, a hydrocarbon liquid, or a powdered coal.

In various examples, the method 600 for operating the combustor includes step 508, wherein the at least one electrode is protected or shielded from heat evolved from the combustion reaction with the nonmetallic combustor body.

In some examples, the method 600 for operating the combustor includes step 510, wherein one or more voltages is at least intermittently applied to the at least one electrode. The method 600 for operating the combustor can include a step wherein the one or more voltages at least intermittently applied by the power supply to the at least one electrode is controlled. In many examples of the method 600 for operating the combustor, the step of controlling the one or more voltages can include causing the power supply to at least intermittently apply a substantially constant voltage to the at least one electrode. For example, the step of controlling the one or more voltages can include causing the power supply to apply a DC voltage to the at least one electrode. Alternatively, the step of controlling the one or more voltages can include causing the power supply to apply a time-varying voltage to the at least one electrode.

In various examples of the method 600 for operating the combustor, the at least one electrode includes a corona electrode configured to eject ions. Step 602 can include providing the flow of air or flue gas external to the nonmetallic combustion body in a volume proximate the at least one electrode. In some examples of the method 600 for operating the combustor, step 602 can include ejecting ions from the at least one electrode into the air or flue gas flow. Step 602 can include passing the ions from the volume proximate to the at least one electrode into the combustion volume.

Various examples of the method 600 include step 514, wherein an effect is created in the combustion reaction responsive to the application of the electrical energy. Step 514 can include increasing the rate of reaction of the combustion reaction. In various examples, step 514 can include decreasing a size of the combustion volume for a given amount of heat evolved from the combustion reaction compared to not applying the electrical energy. Step 514 can include increasing mixing in the combustion reaction. In several examples, step 514 can include decreasing an amount of NOx evolved from the combustion reaction. Step 514 can include decreasing an amount of CO evolved from the combustion reaction. Step 514 can include creating any measurable effect associated with applying the electrical energy or the charged particles to the combustion reaction.

In various examples, the method 600 includes step 516, wherein heat is directed from the combustion reaction to an industrial process or a boiler. In some examples of the method 500, step 516 includes directing heat from the combustion reaction to a gas turbine.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustor, comprising:
 a nonmetallic combustor body having an inner surface and an outer surface defining at least a portion of a combustion volume aligned to carry a combustion reaction with flow in a longitudinal direction, the nonmetallic combustor body inner surface defining a lateral periphery of the combustion volume between an input end configured to receive combustion air and an output end configured to output combustion products, the nonmetallic combustor body being configured to prevent passage of gas from inside the combustion volume to outside the combustion volume between the input end and the output end of the nonmetallic combustor body;
 at least one electrode disposed outside the combustion volume with the nonmetallic combustor body lying at least partially between the at least one electrode and the combustion volume; and
 a power supply operatively coupled to the at least one electrode;
 an electrically conductive shield disposed between a portion of the outer surface of the nonmetallic combustor body and the at least one electrode; and
 at least one port formed in the nonmetallic combustor body;
 wherein the at least one port is configured to allow passage of a flow of air or flue gas from a volume proximate to the at least one electrode and outside the combustion body and the electrically conductive shield into the combustion volume;
 wherein the at least one electrode includes a corona electrode configured to eject ions into the flow of air or flue gas;
 wherein the at least one port is configured to allow the passage of the ions from the volume proximate the at least one electrode into the combustion volume; and
 wherein the at least one electrode is configured to apply electrical energy to the combustion volume.

2. The combustor of claim 1, wherein the power supply is configured to at least intermittently apply one or more voltages to the at least one electrode.

3. The combustor of claim 1, wherein the combustor is configured to provide a flow of cooling air along the outer surface of the nonmetallic combustor body.

4. The combustor of claim 1, wherein the nonmetallic combustor body is configured to protect the at least one electrode from heat evolved from the combustion reaction.

5. The combustor of claim 1, wherein the nonmetallic combustor body comprises:
 a dielectric material.

6. The combustor of claim 5, wherein the nonmetallic combustor body comprises:
 a material having a dielectric constant less than 20.

7. The combustor of claim 6, wherein the nonmetallic combustor body comprises:
 a material having a dielectric constant less than 12.

8. The combustor of claim 1, wherein the nonmetallic combustor body is formed from a material that is semiconducting at room temperature and/or semiconducting at an operating temperature of the nonmetallic combustor body.

9. The combustor of claim 1, wherein the nonmetallic combustor body is formed at least partly from a ceramic.

10. The combustor of claim 9, wherein the ceramic includes silicon carbide.

11. The combustor of claim 1, wherein the nonmetallic combustor body is formed at least partly from at least one selected from the group consisting of alumina, silica, an aerogel, fused quartz glass, sapphire, hafnium diboride (HfB2), zirconium diboride (ZrB2), hafnium nitride (HfN), zirconium nitride (ZrN), titanium carbide (TiC), titanium nitride (TiN), thorium dioxide (ThO2), and tantalum carbide (TaC).

12. The combustor of claim 1, further comprising:
 a power supply controller configured to cause the power supply to apply a DC voltage to the at least one electrode.

13. The combustor of claim 1, further comprising:
 a power supply controller configured to cause the power supply to apply a time-varying voltage to the at least one electrode.

14. The combustor of claim 1, wherein applying electrical energy to the combustion volume includes applying an electric field to the combustion volume.

15. The combustor of claim 1, wherein applying electrical energy to the combustion volume includes providing charged particles to the combustion volume.

16. The combustor of claim 1, wherein the combustion reaction is configured to at least intermittently carry particles having a charge, and wherein the at least one electrode is configured to carry a voltage configured to impart, on the charged particles, an electric field selected to move the charged particles at a velocity component at an angle off-axis to the longitudinal direction defined by the nonmetallic combustor body.

17. The combustor of claim 1, wherein electrical energy is selected to increase a rate of the combustion reaction.

18. The combustor of claim 1, wherein electrical energy is selected to decrease an amount of oxides of nitrogen (NOx) evolved from the combustion reaction.

19. The combustor of claim 1, wherein electrical energy is selected to decrease an amount of carbon monoxide (CO) evolved from the combustion reaction.

20. The combustor of claim 1, wherein the at least one electrode includes a corona electrode configured to eject ions into the flow of air or flue gas.

21. A gas turbine apparatus, comprising:
a compressor configured to compress air;
a combustor configured to receive compressed air from the compressor and support a combustion reaction using oxygen from the compressed air;
a turbine configured to receive a heated combustion gas from the combustor and convert a portion of heat energy of the heated combustion gas into rotational kinetic energy;
a turbine shaft operatively coupled to the turbine and the compressor and configured to transmit at least a portion of the rotational kinetic energy from the turbine to the compressor;
wherein the combustor further comprises:
a nonmetallic combustor body having an inner surface and an outer surface defining at least a portion of a combustion volume aligned to carry the combustion reaction with flow in a longitudinal direction, the nonmetallic combustor body inner surface defining a lateral periphery of the combustion volume between an input end configured to receive combustion air and an output end configured to output combustion products, the nonmetallic combustor body being configured to prevent passage of gas from inside the combustion volume to outside the combustion volume between the input end and the output end of the nonmetallic combustor body;
at least one electrode disposed outside the combustion volume with the nonmetallic combustor body lying at least partially between the at least one electrode and the combustion volume; and
a power supply operatively coupled to the at least one electrode;
wherein the at least one electrode is configured to apply electrical energy to the combustion volume;
an electrically conductive shield disposed between a portion of the outer surface of the nonmetallic combustor body and the at least one electrode; and
at least one port formed in the nonmetallic combustor body;
wherein the at least one port is configured to allow passage of a flow of air or flue gas from a volume proximate to the at least one electrode and outside the combustion body and the electrically conductive shield into the combustion volume;
wherein the at least one electrode includes a corona electrode configured to eject ions into the flow of air or flue gas; and
wherein the at least one port is configured to allow the passage of the ions from the volume proximate the at least one electrode into the combustion volume.

22. The gas turbine apparatus of claim 21, wherein the power supply is configured to at least intermittently apply one or more voltages to the at least one electrode.

23. The gas turbine apparatus of claim 21, wherein the nonmetallic combustor body is configured to protect the at least one electrode from heat evolved from the combustion reaction.

24. The gas turbine apparatus of claim 21, wherein the nonmetallic combustor body comprises:
a dielectric material.

25. The gas turbine apparatus of claim 21, wherein the nonmetallic combustor body is formed from a material that is semiconducting at room temperature and/or semiconducting at an operating temperature of the nonmetallic combustor body.

26. The gas turbine apparatus of claim 21, wherein the nonmetallic combustor body is formed at least partly from a ceramic.

27. The gas turbine apparatus of claim 21, wherein applying electrical energy to the combustion volume includes applying an electric field to the combustion volume.

28. The gas turbine apparatus of claim 21, wherein applying electrical energy to the combustion volume includes providing charged particles to the combustion volume.

29. The gas turbine apparatus of claim 21, wherein the combustion reaction is configured to at least intermittently carry particles having a charge, and wherein the at least one electrode is configured to carry a voltage configured to impart, on the charged particles, an electric field selected to move the charged particles at a velocity component at an angle off-axis to the longitudinal direction defined by the nonmetallic combustor body.

30. The gas turbine apparatus of claim 21, wherein the at least one electrode includes a corona electrode configured to eject ions into the flow of air or flue gas.

31. The gas turbine apparatus of claim 21,
wherein the combustor further comprises an electrically conductive shield disposed between a portion of an outer surface of the nonmetallic combustor body and the at least one electrode,
wherein the combustor further comprises at least one port formed in the nonmetallic combustor body; and
wherein the at least one port is configured to allow passage of a flow of air or flue gas from a volume proximate to the at least one electrode into the combustion volume.

32. The gas turbine apparatus of claim 31, wherein:
the at least one electrode includes a corona electrode configured to eject ions into the flow of air or flue gas; and
the at least one port is configured to allow the passage of the ions from the volume proximate to the at least one electrode into the combustion volume.

33. A method for operating a combustor, comprising:
supporting at least a portion of a combustion reaction in a combustion volume defined by a nonmetallic combustor body having an inner surface and an outer surface defining at least a portion of a combustion volume aligned to carry a combustion reaction with flow in a longitudinal direction, the nonmetallic combustor body inner surface defining a lateral periphery of the combustion volume between an input end configured to receive combustion air and an output end configured to output combustion products;
supporting at least one electrode outside the combustion volume with the nonmetallic combustor body lying at least partially between the at least one electrode and the combustion volume;
applying electrical energy to the combustion volume with the at least one electrode;
disposing an electrically conductive shield between a portion of the outer surface of the nonmetallic combustor body and the at least one electrode;
forming at least one port in the nonmetallic combustor body;

configuring the at least one port to allow passage of a flow of air or flue gas from a volume proximate to the at least one electrode and outside the combustion body and the electrically conductive shield into the combustion volume;

ejecting ions into the flow of air or flue gas from the at least one electrode, the at least one electrode including a corona electrode configured to eject the ions; and configuring the at least one port to allow the passage of the ions from the volume proximate the at least one electrode into the combustion volume.

34. The method for operating the combustor of claim 33, further comprising:
cooling the nonmetallic combustor body by flowing air or flue gas adjacent to the outer surface of the nonmetallic combustor body.

35. The method for operating the combustor of claim 33, further comprising protecting the at least one electrode from heat evolved from the combustion reaction.

36. The method for operating the combustor of claim 33, further comprising causing the combustion reaction to at least intermittently carry particles having a charge.

37. The method for operating the combustor of claim 33, further comprising controlling one or more voltages at least intermittently applied to the at least one electrode.

38. The method for operating the combustor of claim 37, wherein controlling the one or more voltages includes causing a power supply to apply a time-varying voltage to the at least one electrode.

39. A method for operating a combustor, comprising:
supporting at least a portion of a combustion reaction in a combustion volume defined by a nonmetallic combustor body having an inner surface and an outer surface defining at least a portion of a combustion volume aligned to carry a combustion reaction with flow in a longitudinal direction, the nonmetallic combustor body inner surface defining a lateral periphery of the combustion volume between an input end configured to receive combustion air and an output end configured to output combustion products;

supporting at least one electrode outside the combustion volume with the nonmetallic combustor body lying at least partially between the at least one electrode and the combustion volume;

providing charged particles to the combustion volume with the at least one electrode;

applying an electrical energy to the combustion volume with the at least one electrode;

disposing an electrically conductive shield between a portion of the outer surface of the nonmetallic combustor body and the at least one electrode;

forming at least one port in the nonmetallic combustor body;

configuring the at least one port to provide a flow of air or flue gas from a volume proximate to the at least one electrode and outside the combustion body and the electrically conductive shield into the combustion volume;

ejecting ions from the at least one electrode into the flow of air or flue gas, the at least one electrode including a corona electrode configured to eject the ions; and passing the ions from the volume proximate to the at least one electrode into the combustion volume.

40. The method for operating the combustor of claim 39, further comprising protecting the at least one electrode from heat evolved from the combustion reaction.

41. The method for operating the combustor of claim 39, further comprising:
at least intermittently applying, to the at least one electrode, one or more voltages from a power supply.

42. The method for operating the combustor of claim 41, wherein at least intermittently applying one or more voltages from the power supply includes causing the power supply to at least intermittently apply a substantially constant voltage to the at least one electrode.

43. The method for operating the combustor of claim 41, wherein at least intermittently applying one or more voltages from the power supply includes causing the power supply to apply a time-varying voltage to the at least one electrode.

* * * * *